No. 892,731. PATENTED JULY 7, 1908.
H. JACOB.
ANGLE MEASURING INSTRUMENT WITH TELESCOPE.
APPLICATION FILED DEC. 6, 1907.

Witnesses:
A. L. O'Brien
M. Rismann

Inventor
Heinrich Jacob
by
Binney, Brickenstein & Ogden
attys.

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

ANGLE-MEASURING INSTRUMENT WITH TELESCOPE.

No. 892,731.  Specification of Letters Patent.  Patented July 7, 1908.

Application filed December 6, 1907. Serial No. 405,380.

*To all whom it may concern:*

Be it known that I, HEINRICH JACOB, a citizen of the German Empire, residing at 32ª Holsteinischestrasse, Steglitz, near Berlin, Germany, have invented certain new and useful Improvements in Angle-Measuring Instruments with Telescopes, of which the following is a specification.

My invention relates to an angle-measuring instrument with telescope, and its purpose is to allow of very conveniently and quickly obtaining readings with the aid of means of very simple construction.

The purpose of the invention is attained thereby that the instrument is provided with an external main scale and with an auxiliary scale in the field of view of the telescope, said auxiliary scale showing fractions of the main scale or horizontal circle and having a range corresponding at least to one unit of the main scale; a locking device being provided which only allows of moving the telescope, relatively to its support, through complete divisions of the main or horizontal scale.

The locking device preferably consists of teeth arranged on the horizontal circle or on the alidade, with the tooth spaces equal, as regards angle-value, to units of the horizontal scale, and engaging a releasable pawl mounted on that part of the instrument which is adjustable relatively to the teeth.

The secondary scale in the image-plane of the telescope is preferably so arranged that its terminal marks are substantially symmetrical relatively to the center line of the ring in the field of view.

The invention is illustrated in the annexed drawing, in which

Figure 1:
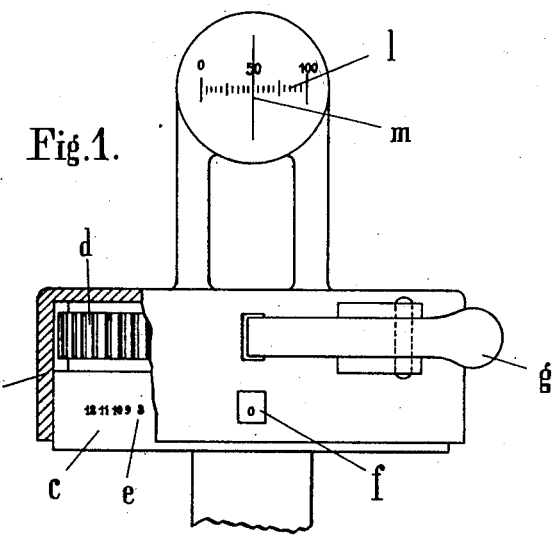
Figure 2:
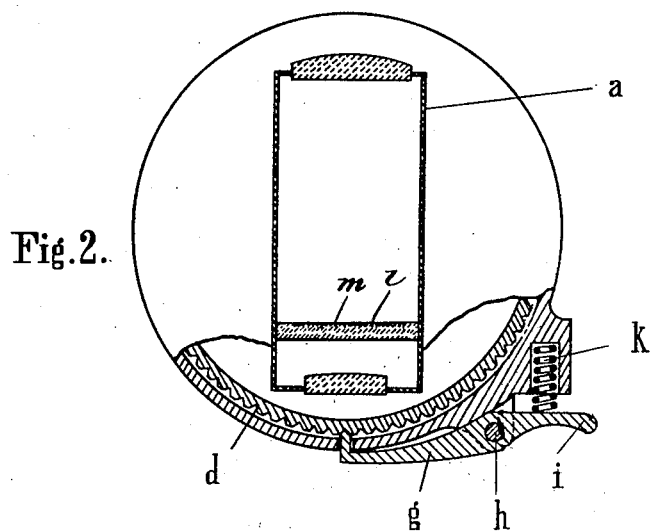

Figure 1 is a side view, Fig. 2 a diagrammatic plan view, partly in section.

The telescope is marked $a$. The alidade $b$ thereof is mounted on a support $c$ which is provided with teeth $d$ and carries the horizontal scale $e$. The latter consists, in the example illustrated, of a single row of numerals which are only separately visible through a window $f$ consisting of an aperture in the alidade $b$. This arrangement is recommended, because it excludes errors in reading. The alidade $b$ forms the carrier of a pawl $g$ engaging the teeth $d$, said pawl being rotatable about the pivot $h$ and having a finger plate. $k$ is a spring which tends to hold the pawl $g$ in engagement. $l$ is a secondary scale in the field of view of the telescope. The line $m$ is the center line of the ring in the field of view.

The manner in which the instrument is used is as follows: Assuming that the angle-distance between two objects is to be determined, the instrument is first so placed that on sighting one object, zero on the horizontal scale appears in the window-aperture $f$, while at the same time the image of the object in the telescope coincides with the zero-mark of the secondary scale $l$. Thereupon the pawl $g$ is disengaged and the alidade is moved relatively to the support $c$ of the horizontal scale until the other object appears within the subsidiary scale $l$ in the field of view of the telescope, and the pawl $g$ is allowed to reëngage. If then the number "20" of the horizontal scale appears in the window-aperture, and the image of the second object coincides with the scale division 75 of the secondary scale $l$, the angle-distance between the two objects is 20.75 units of the scale.

Having now particularly described and ascertained the nature of my said invention and in what manner the same is to be performed I declare that what I claim is:

1. In an angle-measuring instrument a telescope, a support for same, the telescope being rotatably mounted on its support, a main scale showing the position of said telescope with relation to said support, a secondary scale in the field of view of the telescoep and locking devices allowing of moving the telescope relatively to its support only through complete divisions of the main scale.

2. In an angle-measuring instrument a telescope, a support for same, the telescope being rotatably mounted on its support, a main scale showing the position of said telescope with relation to said support, a secondary scale in the field of view of the telescope showing fractions of the main scale and having a range corresponding at least to one unit of the main scale and locking devices allowing of moving the telescope relatively to its support only through complete divisions of the main scale.

3. In an angle-measuring instrument a telescope, a support for same, the telescope being rotatably mounted on its support, a main scale consisting of a row of numerals provided on one of the said two rotatably connected parts, an opening or window provided at the other part and adapted to successively show the numerals of the main scale on rotating the two parts with relation to each other, a secondary scale in the field of view of the telescope and locking devices allowing of moving the telescope relatively to its support only through complete divisions of the main scale.

4. In an angle-measuring instrument a telescope, a support for same, the telescope being rotatably mounted on its support, a main scale consisting of a row of numerals provided on one of the said two rotatably connected parts, an opening or window provided at the other part and adapted to successively show the numerals of the main scale on rotating the two parts with relation to each other, a secondary scale in the field of view of the telescope showing fractions of the main scale and having a range corresponding at least to one unit of the main scale and locking devices allowing of moving the telescope relatively to its support only through complete divisions of the main scale.

5. In an angle-measuring instrument a telescope, a support for same, the telescope being rotatably mounted on its support, a tooth and pawl connection between said two parts, a main scale showing the position of said telescope with relation to said support and a secondary scale in the field of view of the telescope.

6. In an angle-measuring instrument a telescope, a support for same, the telescope being rotatably mounted on its support, a tooth and pawl connection between said two parts, a main scale showing the position of said telescope with relation to said support, the divisions of said main scale corresponding to the distance of the teeth in said tooth and pawl connection and a secondary scale in the field of view of the telescope.

7. In an angle-measuring instrument a telescope, a support for same, the telescope being rotatably mounted on its support, a tooth and pawl connection between said two parts, a main scale showing the position of said telescope with relation to said support, the divisions of said main scale corresponding to the distance of the teeth in said tooth and pawl connection and a secondary scale in the field of view of the telescope showing fractions of the main scale and having a range corresponding at least to one unit of the main scale.

In testimony whereof I have signed this specification in the presence of two subscribing witnesses.

HEINRICH JACOB.

Witnesses:
WOLDEMAR HAUPT,
HENRY HASPER.